(12) United States Patent
Arntz et al.

(10) Patent No.: US 6,900,424 B2
(45) Date of Patent: May 31, 2005

(54) MICROWAVE DELIVERY SYSTEM FOR A COOKING APPLIANCE

(75) Inventors: Timothy J. Arntz, Cleveland, TN (US); Dennis Michael Brandon Burns, Athens, TN (US); Damien L. Esprit, Cleveland, TN (US); Trieu Huynh, Ooltewah, TN (US); Sondra Denice Proffitt, Springfield, TN (US); Robert Z. Whipple, Jr., Louden, TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/740,815

(22) Filed: Dec. 22, 2003

(65) Prior Publication Data

US 2004/0178194 A1 Sep. 16, 2004

Related U.S. Application Data

(63) Continuation-in-part of application No. 10/299,677, filed on Nov. 20, 2002, now Pat. No. 6,667,466.

(51) Int. Cl.$^7$ ................................................. H05B 6/72
(52) U.S. Cl. ........................ 219/746; 219/748; 219/756; 333/227
(58) Field of Search ............................... 219/745–751, 219/695–696, 756; 333/227, 231

(56) References Cited

U.S. PATENT DOCUMENTS

| | | | |
|---|---|---|---|
| 2,920,174 A | 1/1960 | Haagensen | |
| 3,339,054 A | 8/1967 | Deaton | |
| 3,549,849 A | 12/1970 | Boehm | |
| 4,028,521 A | 6/1977 | Uyeda et al. | |
| 4,121,078 A | 10/1978 | Takano et al. | |
| 4,316,069 A | 2/1982 | Fitzmayer | |
| 4,403,128 A | 9/1983 | Takagi et al. | |
| 4,496,814 A | 1/1985 | Fitzmayer | |
| 4,547,642 A | 10/1985 | Smith | |
| 4,616,119 A | 10/1986 | Shin | |
| 4,833,285 A | 5/1989 | Okamoto et al. | |
| 4,833,286 A | 5/1989 | Ohnishi | |
| 4,866,233 A | 9/1989 | Fritz, deceased | |
| 4,893,584 A | 1/1990 | Doehler et al. | |
| 4,967,050 A | 10/1990 | Okamoto et al. | |
| 5,567,339 A | 10/1996 | Joo et al. | |
| 5,632,921 A | 5/1997 | Risman et al. | |
| 5,990,466 A | 11/1999 | McKee et al. | |
| 6,008,483 A | 12/1999 | McKee et al. | |
| 6,209,482 B1 | 4/2001 | Doehler | |
| 6,218,650 B1 | 4/2001 | Tsukamoto et al. | |
| 6,667,466 B1 * | 12/2003 | Whipple, Jr. | ............... 219/746 |

FOREIGN PATENT DOCUMENTS

| | | |
|---|---|---|
| DE | 4120992 | 1/1993 |
| EP | 0 632 678 | 1/1995 |

* cited by examiner

*Primary Examiner*—Philip H. Leung
(74) *Attorney, Agent, or Firm*—Diederiks & Whitelaw, PLC

(57) ABSTRACT

A microwave delivery system for a cooking appliance includes a toroidal waveguide, a launching zone and a waveguide cover. The launching zone includes opposing top, bottom and side walls that form a pathway for a microwave energy field to travel from a magnetron through the waveguide and into a cooking chamber. In accordance with one aspect of the overall invention, the bottom wall of the launching zone is aligned with a bottom surface of the waveguide to establish a direct conducting surface for the microwave energy field. The waveguide cover shields a hollow interior portion of the waveguide from cooking byproducts generated in the cooking chamber during a cooking process. The waveguide cover is preferably constituted by a metallic conductor having a finish that enhances the microwave energy field distribution in the cooking chamber.

13 Claims, 4 Drawing Sheets

MICROWAVE DELIVERY SYSTEM FOR A COOKING APPLIANCE

CROSS-REFERENCE TO RELATED APPLICATIONS

This application is a continuation-in-part of U.S. patent application Ser. No. 10/299,677 entitled "MICROWAVE DELIVERY SYSTEM FOR A COOKING APPLIANCE" filed on Nov. 20, 2002, now U.S. Pat. No. 6,667,466.

BACKGROUND OF THE INVENTION

1. Field of the Invention

The present invention pertains to the art of microwave cooking appliances and, more particularly, to an microwave energy delivery system including a metallic waveguide cover that enhances microwave energy field distribution in a cooking chamber of the cooking appliance.

2. Discussion of the Prior Art

Cooking appliances utilizing a directed microwave energy field to cook a food item have existed for some time. In general, a cooking process is performed by heating the food item by directing a standing microwave energy field into an oven cavity such that the microwave energy field reflects about the oven cavity and impinges upon the food item. As the microwave energy fields impinge upon the food item, the fields are converted into heat through two mechanisms. The first heating mechanism is caused by the linear acceleration of ions, generally in the form of salts, present within the food item. The second heating mechanism is the molecular excitation of polar molecules, primarily water, present within the food item. Regardless of the mechanism, the nature of the standing waves results in localized areas of high and low energy which cause the food to cook unevenly. This is especially true in larger ovens where the size of the cavity requires a more uniform energy distribution in order to properly cook the food. To attain an even, or uniform energy distribution, the microwave energy must be introduced into the oven cavity in a manner which creates a constructive standing wave front which will propagate about the oven cavity in a random fashion.

Various methods of directing microwaves into cooking chambers to minimize hot and cold areas within a food item have been proposed in the prior art. These methods range from altering the pattern of the standing waves by varying the frequency of the microwave energy field, to incorporating a stationary mode stirrer which simulates a change in the geometric space of the cooking chamber.

Methods of changing the wave pattern also include the incorporation of a rotating blade stirrer which functions to reflect microwave energy into a cooking cavity in various patterns. Traditionally, stirrers have been located in various points in the microwave feed system, ranging from adjacent to a microwave energy source, to a position within the cooking chamber itself. Some stirrers include various openings which are provided to disperse the standing waves, and others have various surface configurations designed to reflect the standing waves. Stirrers are either driven by a motor, or by air currents supplied by a blower. In any event, all of these methods share a common theme, i.e., to reflect and/or deflect the microwave energy into a cooking cavity such that a uniform distribution of standing wave patterns can be achieved.

Other methods include modifying the structure of the waveguide itself. Waveguide designs include cylinders, square boxes, and a variety of other configurations, each having an exit window through which the microwave energy can pass. While these designs may cause the standing waves to interfere with one another such that the wave pattern was randomized, substantial energy is typically lost with such an arrangement.

Still other methods are directed to rotating or moving the food being cooked within the cooking chamber. Ovens employing this method, position the food on a rotatable platter which is rotated through the standing wave patterns such that the food is more uniformly exposed to the microwaves. While these methods are fine for smaller ovens, they are hardly practical for larger conventional ovens where space is more of a concern. As oven cavities have grown in size and microwave technology has been combined into conventional or convection ovens, the uniform distribution of the standing waves has become of even greater concern. For this reason, manufacturers have modified their designs to include multiple magnetrons, multiple stirrers, and motor driven, variable speed stirrers, all of which were intended to create a random wave pattern thought to be of a more uniform character. Certainly, the mechanisms which serve to defect the microwave energy field, e.g., stirring fans and turntables, add to the complexity of designs and introduce multiple failure points, thus reducing the service life of such appliances. Furthermore, in an age where energy consumption is of a concern, the need for an energy efficient cooking appliance is desired.

Based on the above, there exists a need for a microwave delivery system which will direct a uniform standing wave pattern into an cooking chamber in a manner that reduces the complexity of system components, minimizes energy losses within a waveguide, and provides a uniform, maximum energy field source to the cooking chamber.

SUMMARY OF THE INVENTION

The present invention is directed to a microwave cooking appliance including a cooking chamber, and a microwave energy delivery system including an annular, toroidal-shaped waveguide, a launching zone, and a magnetron. In one form of the invention, the waveguide includes an upper surface, a hollow interior portion exposed to the cooking chamber, and a circular bottom surface. The launching zone serves as an interface between the magnetron and the waveguide. The launching zone includes a first end which is open to the waveguide and a second end onto which a microwave energy source is mounted. Actually, the launching zone is rectangular in cross-section and includes top, bottom, and opposing side walls that define a passage through which the microwave energy field travels. In one preferred form of the invention, the bottom wall is aligned with the bottom surface of the waveguide. The microwave energy source takes the form of a magnetron including an antenna which extends into the launching zone. Upon activation of the magnetron, a microwave energy field is generated in the launching zone, directed through the toroidal waveguide, and into the cooking chamber.

In further accordance with the invention, the microwave delivery system includes a waveguide cover that shields the hollow interior portion of the toroidal-shaped waveguide from cooking byproducts generated in the cooking chamber during a cooking process. Preferably, the waveguide cover includes a plurality of microwave transparent regions that correspond to an associated plurality of microwave transparent regions arrayed about the bottom surface of the waveguide. Most preferably, the microwave transparent regions are aligned so as to coincide with high energy peaks of the microwave energy field. In the most preferred form of the invention the waveguide cover is constituted by a metallic conductor. The metallic conductor includes an exposed, preferably aluminum finished surface which enhances the microwave energy field distribution in the cooking chamber.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
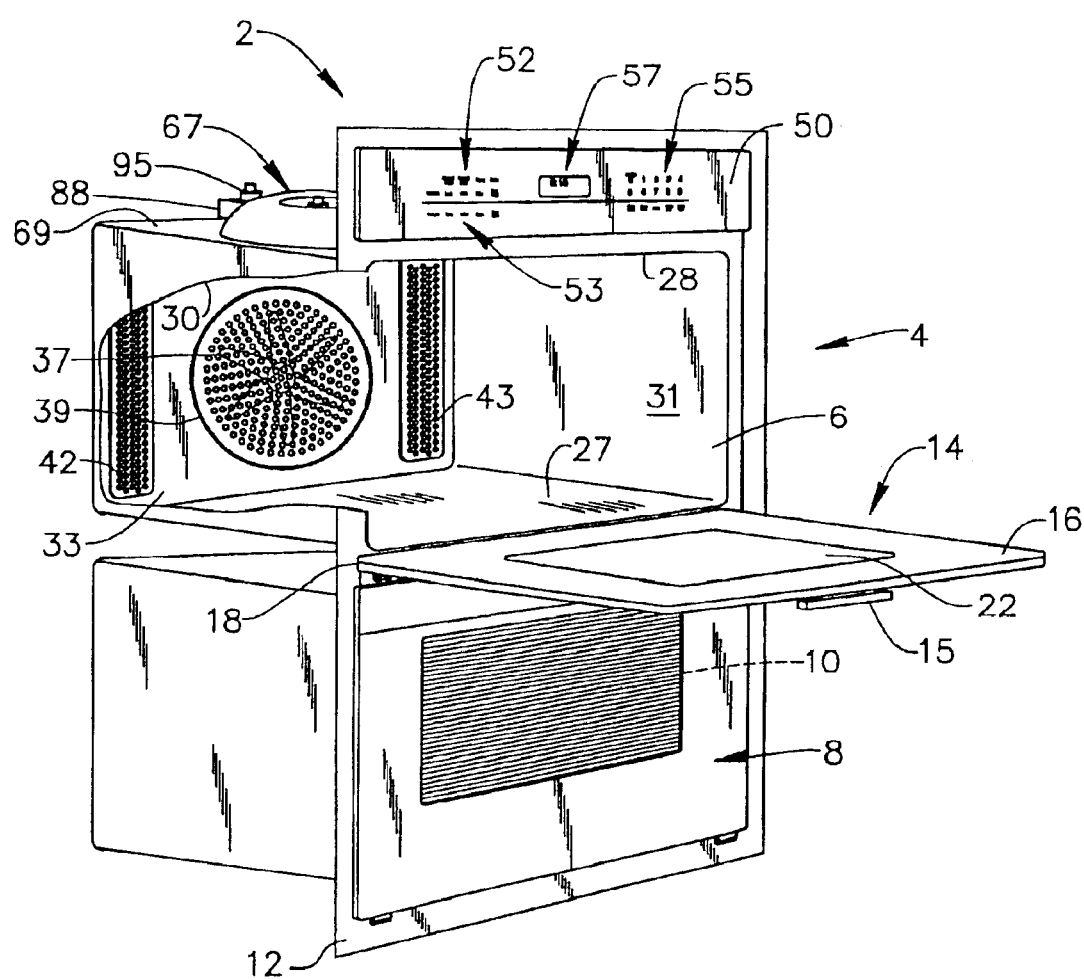
FIG. 1 is a perspective view of a combination microwave/convection wall oven including a toroidal waveguide and launching zone constructed in accordance with the present invention.

With initial reference to FIG. 1, a microwave cooking appliance constructed in accordance with the present invention is generally indicated at 2. Although the form of cooking appliance 2 in accordance with the present invention can vary, the invention is shown in connection with cooking appliance 2 depicted as a wall oven. More specifically, in the embodiment shown, cooking appliance 2 constitutes a dual oven wall unit including an upper oven 4 having upper cooking chamber 6 and a lower oven 8 having a lower cooking chamber 10. In the embodiment shown, upper oven 4 is adapted to perform a rapid cook or combination microwave/convection cooking process, and lower oven 8 is provided to perform a standard convection and/or radiant heat cooking operation. As shown, cooking appliance 2 includes an outer frame 12 for supporting upper and lower cooking chambers 6 and 10.

In a manner known in the art, a door assembly 14 is provided to selectively provide access to upper cooking chamber 6. As shown, door assembly 14 is provided with a handle 15 at an upper portion 16 thereof. Door assembly 14 is adapted to pivot at a lower portion 18 to enable selective access to within cooking chamber 6. In a manner also known in the art, door 14 is provided with a transparent zone 22 for viewing cooking chamber 6 while door 14 is closed.

As best seen in FIG. 1, cooking chamber 6 is defined by a bottom portion 27, an upper portion 28, opposing side portions 30 and 31, and a rear portion 33. Bottom portion 27 is preferably constituted by a flat, smooth surface designed to improve the cleanability, serviceability, and reflective qualities of cooking chamber 6. In the embodiment shown, arranged on rear portion 33 is a convection fan 37 having a perforated cover 39 through which heated air can be withdrawn from cooking chamber 6. Heated air is re-introduced into cooking chamber 6 through vents 42 and 43 arranged on either side of fan 37. In addition, a broil element 45, shown in the from of a sheathed, resistive electric heating element, is provided at upper portion 28 of cooking chamber 6. Although cooking appliance 2 is depicted as a wall oven, it should be understood that the present invention is not limited to this model type and can be incorporated into various types of oven configurations, e.g., cabinet mounted ovens, as well as slide-in and free standing ranges.

Further shown in FIG. 1, cooking appliance 2 includes an upper control panel 50 incorporating first and second rows of oven control button rows 52 and 53. Control buttons 52 and 53, in combination with a numeric pad 55 and a display 57, enable a user to establish particular cooking operations for upper and lower ovens 4 and 8 respectively. Since the general programming and operation of cooking appliance 2 is known in the art and does not form part of the present invention, these features will not be discussed further here. Instead, the present invention is particularly directed to the incorporation and construction of a microwave energy delivery system for delivering a microwave energy field into cooking chamber 6 as will be detailed fully below.

Figure 2:
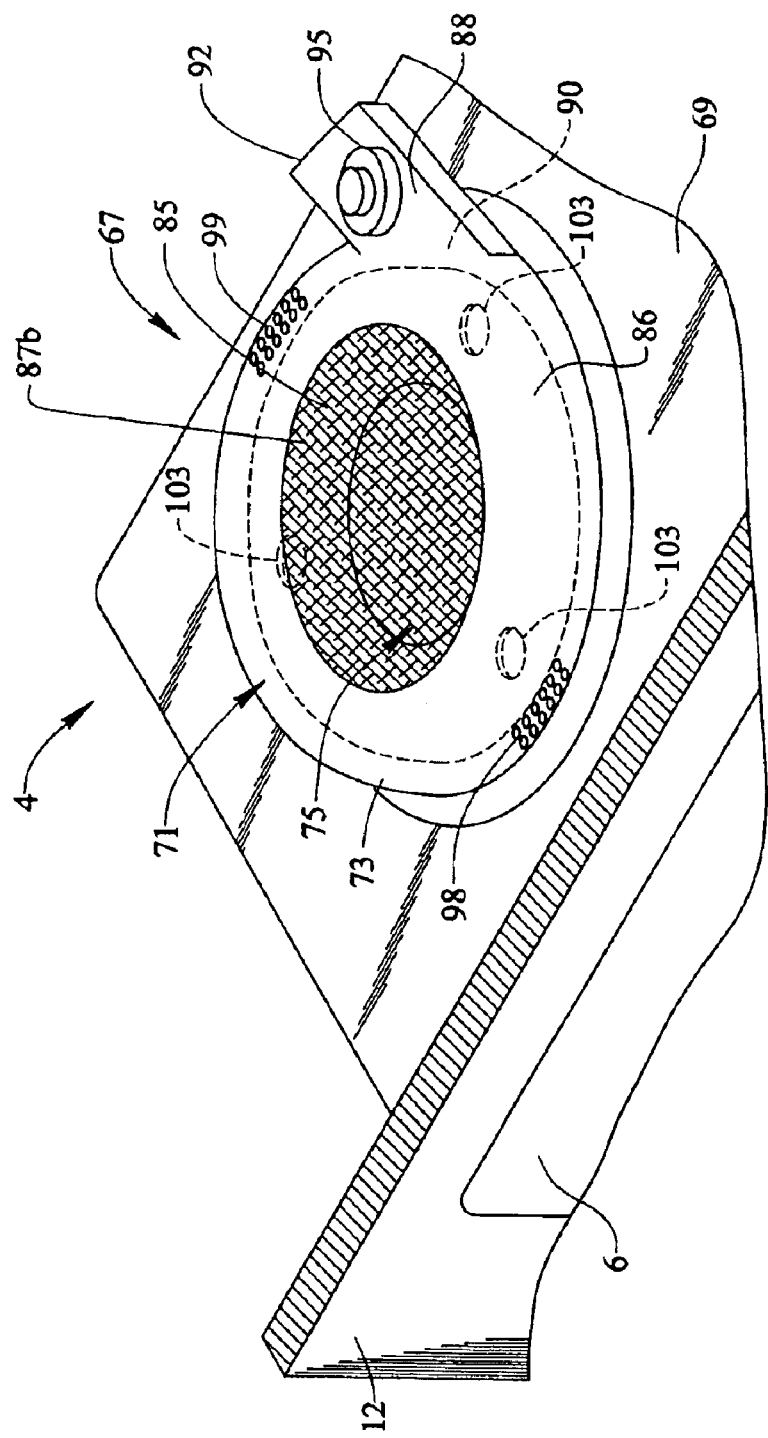
FIG. 2 is a perspective view of the toroidal waveguide and launching system of the present invention.
Figure 3:
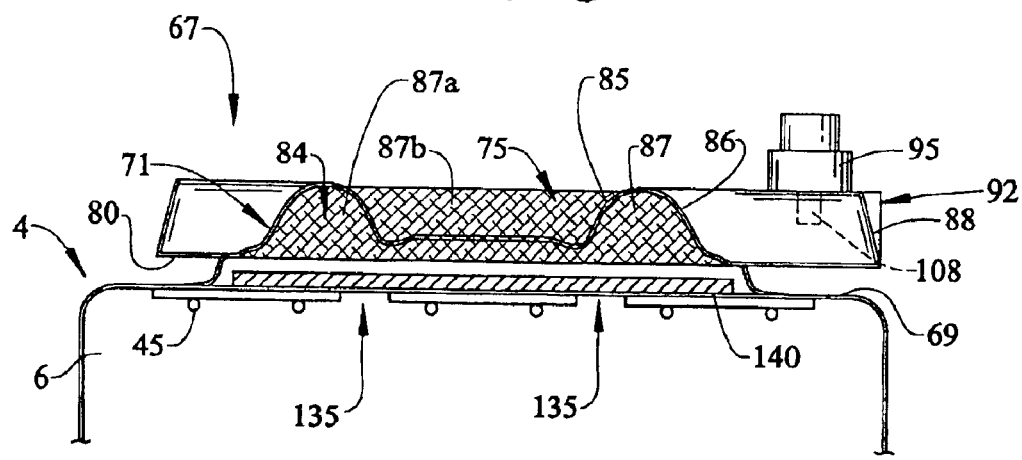
FIG. 3 is a cross-sectional view of the waveguide and launching zone of FIG. 2.
Figure 4:
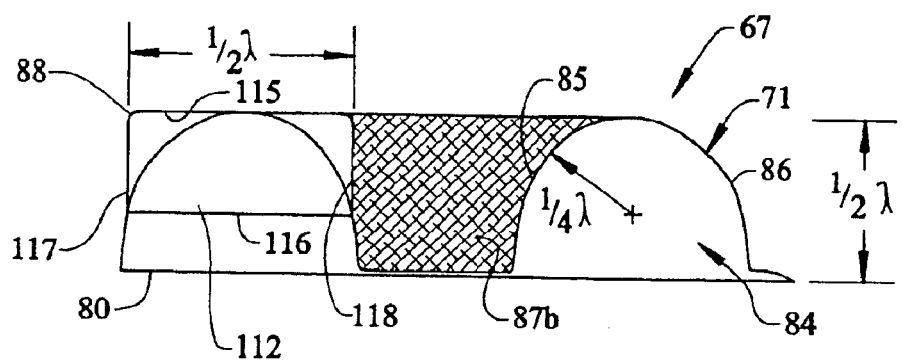
FIG. 4 is an enlarged cross-sectional view of the launching zone of FIG. 3.

With reference to FIGS. 2–4, a waveguide 67 is shown mounted on an exterior upper portion 69 of cooking chamber 6. More specifically, waveguide 67 includes an annular toroidal or torus ring 71 having an upper surface 73 defining a central depression 75, and a bottom surface 80. In a preferred form of the invention, waveguide 67 further includes a hollow interior portion 84, defined between inner and outer walls 85 and 86, having a defined torus ring or cross-sectional diameter and a defined centerline diameter. Waveguide 67 is preferably formed from coated aluminum which provides enhanced reflective qualities, while also decreasing any IR emissivity. As such, energy loses due to the absorption of microwave energy are minimized. In a preferred arrangement, the torus ring diameter of waveguide 67 is set equal to ½λ, and the centerline diameter of waveguide 67 is equal to 2λ, where λ is defined as the wavelength of the microwave energy field transmitted into waveguide 67.

In a preferred form of the present invention, hollow interior portion 84 and central depression 75 contain a quantity of insulation material 87$a$ and 87$b$. In general, insulation material 87 may be of any type of known insulation provided that the material is transparent or substantially transparent to microwave energy. Examples of acceptable types of insulation material are standard spun glass, fiberglass insulation, ceramic fiber insulation, or the like. The addition of insulation material 87$a$ to hollow interior portion 84 limits heat transfer losses to approximately the same level as an oven simply covered with an insulation blanket, but does not require insulation to be added over the waveguide. In this manner, cooking appliance 2, if required, can be used in a more space restrictive application.

As best shown in FIG. 2, a launching zone 88 is provided which includes a first end defining an exit 90 opening into waveguide 67, and a second, terminal end 92 which constitutes a rear, microwave reflecting wall. Mounted on an upper portion of terminal end 92 is a magnetron or microwave emitter 95. In a manner known in the art, magnetron 95 emits microwave or RF energy of a defined wavelength (λ) into launching zone 88. In a preferred configuration, magnetron 95 emits microwave energy at a wavelength of 2.45 GHz. However, it should be noted that waveguide 67 of the present invention is adaptable to any acceptable wavelength used for cooking.

Referring further to FIG. 2, arranged about a front portion of waveguide 67 are a plurality of inlet openings 98. More specifically, inlet openings 98 are positioned to allow a flow of cooling air to enter interior portion 84. Additionally, a plurality of exhaust openings 99 are arranged on a rear portion of waveguide 67, adjacent to launching zone 88, to allow heated air to escape from interior portion 84. In this manner, waveguide 67 also serves as an air duct, further eliminating the amount of insulation required over cooking chamber 6. Inlet openings 98 and exhaust openings 99 are sized and positioned such that the reflected microwave energy field will not escape from interior portion 84.

As best seen in FIG. 2, a plurality of cavity excitation ports 103 are arranged about bottom surface 80 of waveguide 67. Specifically, cavity excitations ports 103 are located about bottom surface 80 at each point where a maximum energy node will occur. As such, in the most preferred form of the invention, three equally spaced excitation ports are positioned at $½\lambda$ points located about bottom surface 80.

A particularly important aspect of the present invention is the design of rectangular launching zone 88. In a manner known in the art, magnetron 95 includes an antenna 108, from which the microwave energy field emanates. In accordance with a preferred embodiment, antenna 108 extends into launching zone 88 and is preferably positioned between hollow interior portion 84 and the rear reflecting wall 92. In a manner also known in the art, magnetron 95 emits microwaves of a defined wavelength into launching zone 88 which are subsequently delivered into waveguide 67. In a preferred configuration, magnetron 95 emits microwave energy at a wavelength of 2.45 GHz, however, it should be noted that the waveguide of the present invention is adaptable to any wavelength.

In a preferred form of the present invention, shown in FIG. 4, launching zone 88 includes an interior metallic surface 112 defined by opposing upper and lower walls 115 and 116 each having a respective width x, and opposing side walls 117 and 118 each having a respective height y. In a manner similar to that of hollow interior portion 84, interior metallic surface 112 is formed from coated aluminum. In a more preferred form of the invention, each respective width x is set equal to $½ \lambda$ and each respective height y is set equal to $¼\lambda$, where $\lambda$ is the frequency of the microwave energy delivered by magnetron 95. In a preferred arrangement, launching zone 88 is positioned such that the centerline of launching zone 88 is aligned with the centerline of torus ring 71, however, other arrangements are possible without departing from the scope of the present invention. For example, one acceptable alternative locates launching zone 88 perpendicular to torus ring 71.

Figure 5:
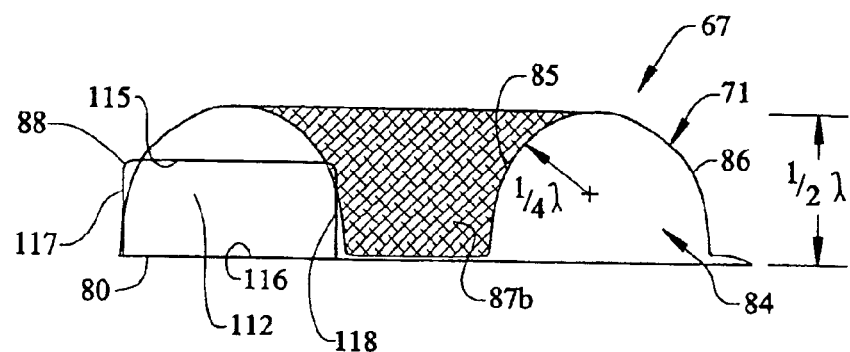
FIG. 5 is a cross-sectional view of the waveguide and launching zone constructed in accordance with a second embodiment of the present invention.

In accordance with another embodiment of the present invention, lower wall 116 of launching zone 88 is aligned with bottom surface 80 of waveguide 67 as represented in FIG. 5. In this manner, a continuous, direct conducting surface is established that provides a path for the microwave energy to propagate from antenna 108 of magnetron 95. This direct conducting surface further enhances the coupling of the microwave or RF energy field by providing a continuous pathway through launching zone 88, into and around the centerline of toroidal-shaped waveguide 67, before launching the energy field into cooking chamber 6. This design causes a mixing action to occur within waveguide 67 that generates multiple high energy nodes that establish constructive standing waves inside cooking chamber 6. The constructive standing waves illuminate cooking chamber 6 with an extremely uniform energy field having a variation of less than approximately ½%. With this overall construction, a uniform cooking environment is achieved in cooking chamber 6 without requiring any additional energy field modification, such as through the use of a mode stirrer.

In the most preferred form of the invention, the interior height of hollow interior portion 84 is set to $½\lambda$ in order to tune the microwave energy field as it propagates about torus ring 71. By setting the height of hollow interior portion 84 at $½\lambda$, a maximum energy node is established around the inside and outside of torus ring 71. Specifically, the microwave energy field traveling from launching zone 88, through waveguide 67 into cooking chamber 6 is tuned for maximum uniformity. As such, further modification of the microwave energy field such as the incorporation of a mode stirrer, is not required.

In another form of the invention, a plurality of microwave windows 135 are positioned below a respective one of cavity excitation ports 103. Thus, as the microwave energy field propagates about torus ring 71, microwave energy is transmitted from waveguide 67 through microwave windows 135 and into cooking chamber 6 whereupon the microwave energy impinges upon the food item to perform a cooking operation. As the microwave energy is released through cavity excitation ports 103 into cooking chamber 6, constructive and destructive wave interferences will occur. In this manner, the microwave energy field is focused, and caused to move about cooking chamber 6 delivering a high, uniform energy density to the food item.

In a more preferred form of the invention, a waveguide cover 140 is arranged between waveguide 67 and microwave windows 135. In general, waveguide cover 140 is designed to withstand the highest oven operating temperatures in addition to being transparent to microwave energy. As such, microwave cover 140 can be formed from Pyrex glass, ceramic sheets, mica, silicon mica or the like. The incorporation of waveguide cover 140 prevents cooking byproducts such as grease, oil, fats and the like from entering waveguide 67.

Reference will now be made to FIGS. 1–4 is describing a preferred method of operation of cooking appliance 2. Prior to initializing a cooking operation, a food item is placed into cooking chamber 6. Control 52 is operated either individually, or in conjunction with control 55 to select a desired cooking operation. Upon activation, magnetron 95 begins to emit a microwave energy field from antenna 108 into launching zone 88. The microwave energy field then impinges upon the interior metallic surface 112 of launching zone 88 located adjacent to antenna 108. The microwaves subsequently propagate toward waveguide 67 and away from rear reflection wall 92. In this manner, the microwave energy field couples with top and bottom walls 115 and 116 and side walls 117 and 118 thus enhancing the transmission of energy from launching zone 88 to waveguide 67. Experience has shown that the energy coupling created within launching zone 88 significantly increases the efficiency of the microwave delivery system. In some cases, the efficiency level can rise as much as 200%.

Figure 6:
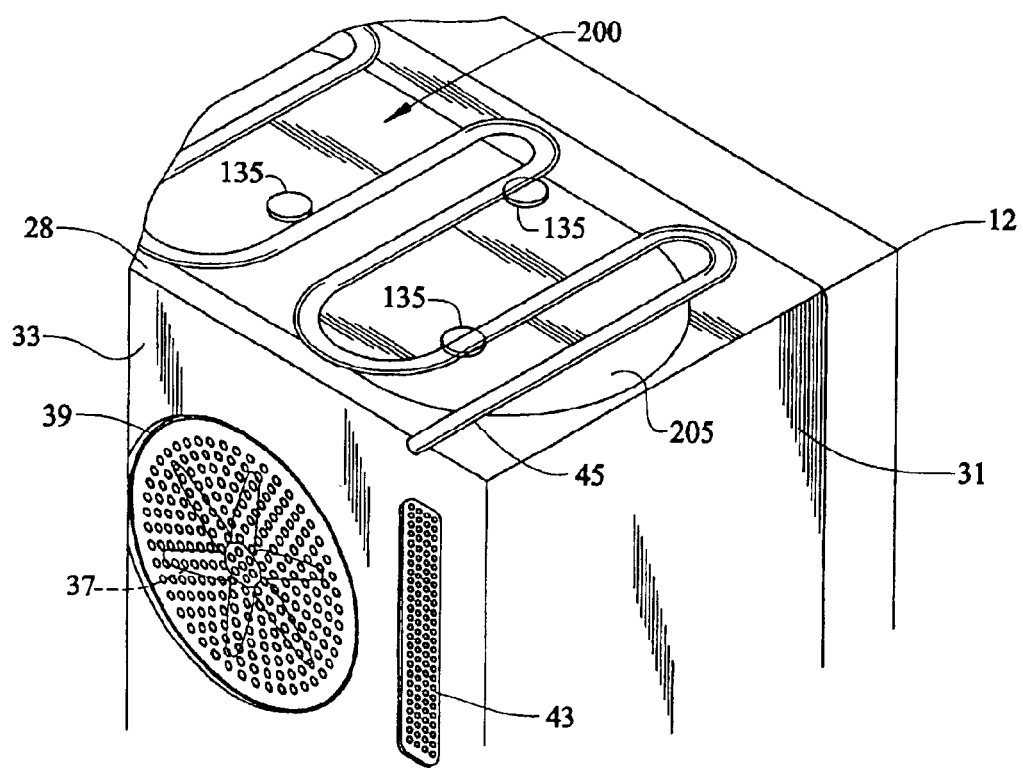
FIG. 6 is a partial, lower left perspective view of an interior of a cooking chamber illustrating a waveguide cover constructed in accordance with the present invention.

Reference will now be made to FIG. 6 in describing a waveguide cover 200 constructed in accordance with a further embodiment of the present invention. As shown, waveguide cover 200 is arranged above broil element 45 on upper portion 28 of cooking chamber 6. Preferably, waveguide cover 200 defines a smooth, flat metallic conductor surface 205 through which extend microwave windows 135. Although windows 135 are depicted as openings in conductor surface 205, it should be understood that windows 135 could be constituted by regions formed on conductor surface 205 that are transparent to microwave or RF energy without creating actual openings in waveguide cover 200. As set forth above, microwave windows 135 correspond to openings 103 in bottom surface 80 of waveguide 67. Openings 103 are positioned along a centerline of toroidal-shaped waveguide 67 and are aligned at each point where a maximum energy node or high energy peak will occur. In accordance with this preferred form of the invention, metallic conductor surface 205 has an aluminum finish that provides maximum reflectivity of the microwave or RF energy waves, in addition to increasing the thermal resistance, in cooking chamber 6. Thus, waveguide cover 200 further improves the energy field distribution within cooking chamber 6 so that food items are exposed to a more uniform cooking process.

In addition to improving microwave performance, waveguide cover 200 contributes to the performance of broil element 45. During a broil operation, broil element 45 is activated to direct radiant heat energy onto an exposed surface of a food item. Due to the structure of broil element 45, a portion of heat energy generated is actually radiated in a direction away from the food item. That is, some portion of the heat energy is directed upward toward upper portion 28 of cooking chamber 6. This portion of the heat energy either dissipates or simply contributes to the overall heating of oven chamber 6. In either case, the heat energy is not directed onto the exposed surface of the food item as desired for by the broil operation. However, in accordance with another aspect of the present invention, the aluminum finish provided on metallic surface 205 operates to reflect the portion of the heat energy directed upward from broil element 45 back onto the food item. In this manner, the overall efficiency of the broil operation is improved.

Based on the above, it should be readily apparent that the invention provides for an improved microwave energy delivery system, in the form of a toroidal waveguide and microwave energy launching system that creates a uniform cooking environment for a food item. In any event, it should be understood that although described with reference to a preferred embodiment of the invention, it should be readily understood that various changes and/or modifications can be made to the invention without departing from the spirit thereof. For instance, the invention while described in terms of a microwave/convection wall oven, can be included in a combination oven range or self standing microwave oven without departing from the scope of the present invention. Also, while the reflective finish provided on waveguide cover 200 is established through the use of aluminum, a variety of other reflective finishes could be employed. Finally, it should be recognized that the use of terms such as top, bottom, left and right have been presented for illustrative purposes only and should not limit the scope of the present invention. Instead, the invention is only intended to be limited by the scope of the following claims.

We claim:

1. A microwave cooking appliance comprising:
   a cooking chamber;
   a toroidal-shaped waveguide including inner and outer walls, and a bottom surface which collectively define a hollow interior portion exposed to the cooking chamber;
   a launching zone having opposing top, bottom and side walls that define a pathway having first and second end portions and a cross-section which is different from a cross-section of the toroidal-shaped waveguide, with said first end portion opening into the hollow interior portion;
   a magnetron including an antenna for emitting a microwave energy field directed into the cooking chamber through the waveguide, said magnetron being mounted at the second end portion of the launching zone with said antenna extending into the launching zone, wherein the microwave energy field is directed into the launching zone, through the waveguide and into the cooking chamber; and
   a waveguide cover disposed between the cooking chamber and the bottom surface of the waveguide, said waveguide cover constituting a metallic conductor cover, wherein the waveguide cover shields the hollow interior portion from cooking byproducts generated in the cooking chamber during a cooking process.

2. A microwave cooking appliance comprising:
   a cooking chamber;
   a toroidal-shaped waveguide including inner and outer walls, and a bottom surface which collectively define a hollow interior portion exposed to the cooking chamber;
   a launching zone defining a pathway having first and second end portions and a cross-section which is different from a cross-section of the toroidal-shaped waveguide, with said first end portion opening into the hollow interior portion; and
   a magnetron including an antenna for emitting a microwave energy field directed into the cooking chamber through the waveguide, said magnetron being mounted at the second end portion of the launching zone with said antenna extending into the launching zone, wherein the microwave energy field is directed into the launching zone, through the waveguide and into the cooking chamber.

3. The microwave cooking appliance according to claim 2, wherein the bottom wall of the launching zone is aligned with the bottom surface of the toroidal-shaped waveguide.

4. The microwave cooking appliance according to claim 3, wherein the cross-section of the launching zone is generally rectangular in shape.

5. A microwave cooking appliance comprising:
   a cooking chamber;
   a toroidal-shaped waveguide including inner and outer walls, and a bottom surface which collectively define a hollow interior portion exposed to the cooking chamber;
   a launching zone having opposing top, bottom and side walls that define a pathway having first and second end portions, with said first end portion opening into the hollow interior portion;
   a magnetron including an antenna for emitting a microwave energy field directed into the cooking chamber through the waveguide, said magnetron being mounted at the second end portion of the launching zone with said antenna extending into the launching zone, wherein the microwave energy field is directed into the launching zone, through the waveguide and into the cooking chamber; and
   a waveguide cover disposed between the cooking chamber and the bottom surface of the waveguide, said waveguide cover constituting a metallic conductor cover, wherein the waveguide cover shields the hollow interior portion from cooking byproducts generated in the cooking chamber during a cooking process.

6. The microwave cooking appliance according to claim 5, wherein the bottom wall of the launching zone is aligned with the bottom surface of the toroidal-shaped waveguide.

7. The microwave cooking appliance according to claim 6, wherein the cross-section of the launching zone is generally rectangular in shape.

8. The microwave cooking appliance according to claim 5, wherein the toroidal-shaped waveguide includes a plurality of microwave transparent zones arranged about a centerline of the bottom surface.

9. The microwave cooking appliance according to claim 8, wherein the microwave transparent zones are positioned at points that coincide with high energy peaks of the microwave energy field.

10. The microwave cooking appliance according to claim 9, wherein the metallic conductor cover includes a plurality of launch openings, said plurality of launch openings corresponding to the microwave transparent zones of the toroidal-shaped waveguide.

11. The microwave cooking appliance according to claim 10, wherein the metallic conductor cover includes an aluminum finish exposed to the cooking chamber, said aluminum finish contributing to microwave energy field distribution in the cooking chamber.

12. The microwave cooking appliance according to claim 5, further comprising: a broil element positioned on a top wall of the cooking chamber, said waveguide cover being arranged between the broil element and the top wall of the cooking chamber.

13. The microwave cooking appliance according to claim 5, wherein the metallic conductor cover includes an aluminum finish exposed to the cooking chamber, said aluminum finish contributing to microwave energy field distribution in the cooking chamber.

* * * * *